Sept. 26, 1944. W. O. LYTLE 2,359,131
SIGN
Filed Aug. 29, 1942 2 Sheets-Sheet 1
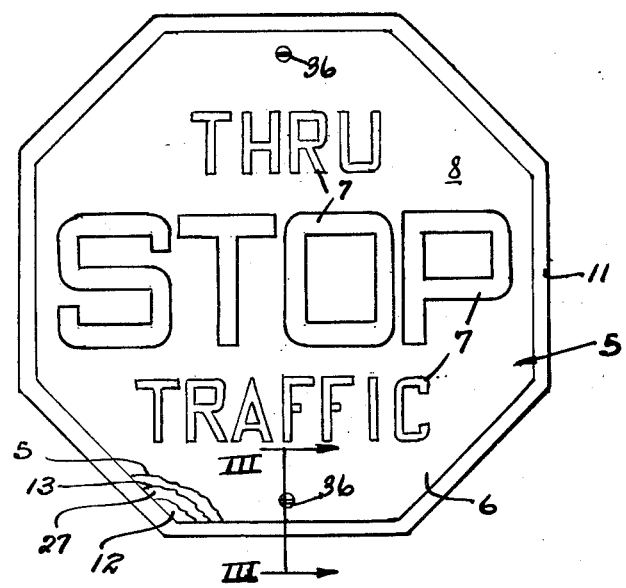
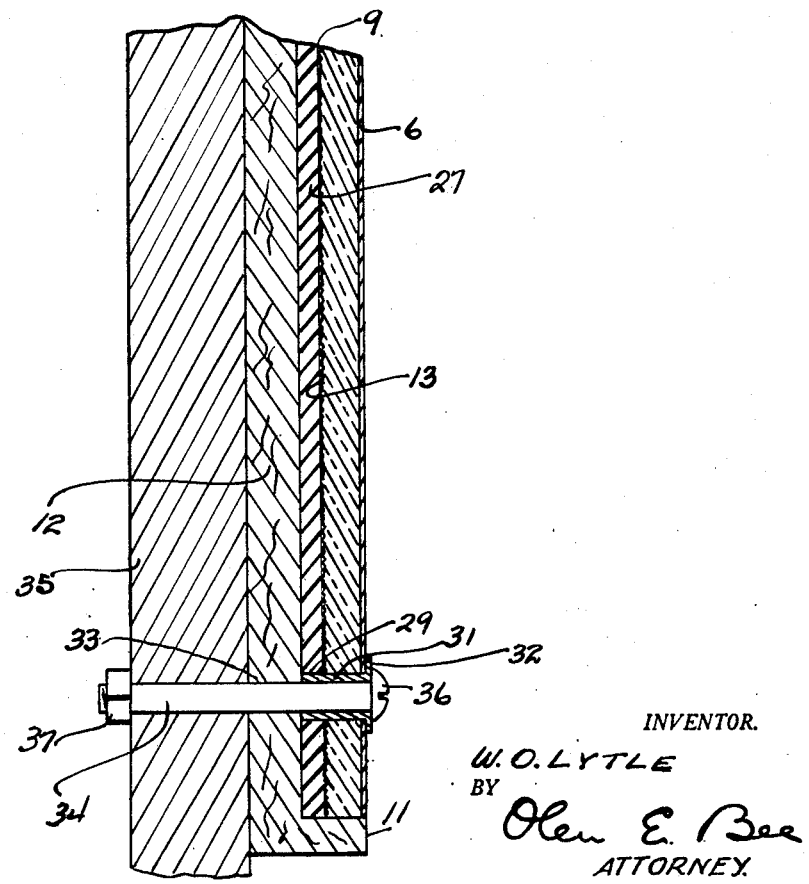
INVENTOR.
W. O. LYTLE
BY
Olen E. Bee
ATTORNEY.

Sept. 26, 1944. W. O. LYTLE 2,359,131
SIGN
Filed Aug. 29, 1942 2 Sheets-Sheet 2

INVENTOR.
W. O. LYTLE
BY
Olen E. Bee
ATTORNEY.

Patented Sept. 26, 1944

2,359,131

UNITED STATES PATENT OFFICE 2,359,131

SIGN

William O. Lytle, New Kensington, Pa., assignor to Pittsburgh Plate Glass Company, Allegheny County, Pa., a corporation of Pennsylvania Application August 29, 1942, Serial No. 456,616

1 Claim. (Cl. 40—135)

The present invention relates to signs or indicators, such as are used for marking highways, places of business and the like, and it has particular relation to signs of the reflector type designed to receive light from the front and to reflect it back in the direction of an observer approaching the sign.

One object of the invention is to provide a reflector sign which is simple of design, inexpensive to manufacture and it is highly durable.

A second object is to provide a reflector sign in which a large proportion of the surface acts as a reflecting medium, thus increasing the amount of light projected to the eye of the observer and increasing the power of the sign to attract the attention of the observer.

A third object is to provide a reflective sign comprising glass as the indicia bearing element, but which in event of breakage still retains a high degree of utility and efficiency.

A fourth object is to provide a simple and convenient way to mount such sign.

These and other objects of the invention will be apparent from consideration of the following specification and the appended claim.

It has heretofore been proposed to form reflector signs and indicia, such as road markers or the like by providing a series of small reflectors, arranged in a suitable pattern. The reflectors comprise spherical or lenticular buttons of glass having reflector elements at the back thereof designed to receive any light, such as the light from the head lamp of a vehicle and then to project it back to the eye of the observer. Of necessity lenticular buttons require individual mountings, which are relatively expensive. Moreover, the buttons are expensive within themselves to manufacture and even when mounted they usually cover such a small proportion of the sign that the reflectance therefrom is not sufficient in power immediately to catch the attention of the observer.

In accordance with the provisions of the present invention it is proposed to overcome the foregoing difficulties by providing signs or indicia, such as road markers or the like comprising plates or panels of tempered glass having reflecting films upon the back and a layer of opaque materials applied to portions of the front or back faces in such manner as to hide or obscure portions of the silvered surface, thus providing a design or indicia of high reflectivity and a large area.

For a better understanding of the invention, reference may now be had to the accompanying drawings in which:

Figure 1 illustrates a simple embodiment of the invention;

Figure 3 is a fragmentary sectional view taken substantially upon the line III—III of Fig. 1.

It is to be understood that like numerals refer to like parts throughout.

Figure 2:
Figures 2 and 5 illustrate additional embodiments of the invention.

In the form of the invention illustrated in Fig. 1 a panel 5 of any convenient outline, e. g., octagonal, and having portions 6 of its face enameled with a vitreous enamel applied by firing is provided. Openings 7 are formed in the enamel coating constituting indicia upon the field 8. It is formed, preferably, of tempered glass, e. g., a glass which after forming into a plate has been heated approximately to the softening temperature, then suddenly chilled. As a result of this treatment the plate assumes a strength approaching that of cast iron and if it should be broken will suddenly shatter into small diced fragments. The preparation of plates of this type is well understood by those skilled in the art and need not be described in detail.

At least one of the surfaces of this plate is formed as indicated at 9 in Fig. 3, to provide small angular projections, such as lens-like buttons or cubical projections or rugosites that may scatter light striking them, thus increasing the visibility of the sign or that helps to bend the light back to the observer along the line of incidence. These projections may be formed in the rolling or pressing operation with a patterned roller or press roll and indeed most rolled glass has inherently a surface suitable for the purposes of the present invention.

The projections may be upon the front or the back dependent upon the effect desired. In the case of lenticular projections they are especially effective upon the front face. Both faces may be provided with lenses or other forms of projections if so desired.

In Fig. 1 the plate is shown as having a marginal frame 11 of wood or the like, which may be secured to the projecting edge portions of a backing 12, preferably, of wood or any other convenient material. The back surface of the plate is also silvered or otherwise coated with a reflective material, such as aluminum, as indicated at 13 and the silver film extending over the roughened portions 8, of the rear face of the glass, causes light to be scattered and dispersed laterally as well as being reflected directly back toward the source or at a given angle with respect to the angle of incidence. The silver film may be applied over the entire surface at the rear of the plate or it may be applied in a predetermined pattern corresponding or approximately corresponding to the desired indicia upon the plate.

Figure 4:
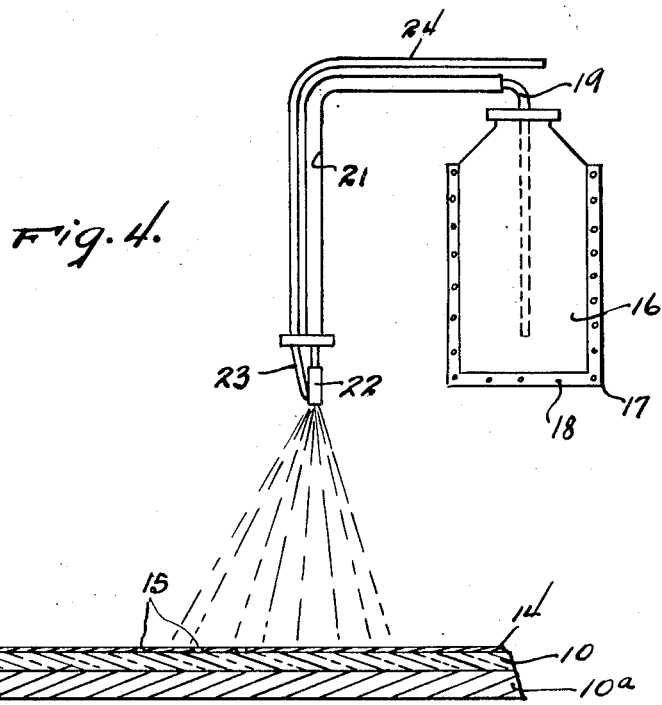
Figure 4 is a view diagrammatically illustrating a method of applying a masking coating to the rear of a glass panel preparatory to silvering it.

In order to obtain patterning of the silver film to correspond to the indicia 7, it may be desired to coat portions of the back of the plate with a thin film of a masking material designed to prevent a deposition of silver upon those portions of the plate which it is desired to preserve free of reflective metal. This conveniently may be accomplished by supporting the plate 10 upon a table 10a and applying over the surface to be silvered a mask 14, having openings 15 corresponding to the design or indicia 7, such as is shown in Fig. 4 and then spraying, roll coating or brushing the surface with a solution of a masking compound, for example, a solution of asphalt in benzene, gasoline or the like. Preferably the amount of solvent is maintained at a low value and the asphaltic solution is heated in order to obtain sufficient reduction of viscosity to admit of application by a spraying operation.

Apparatus for the spraying operation may comprise a container 16 for solution having a jacket 17 suitably heated by means of electrical resistance elements 18 or any other suitable heating device. The solution is drawn upwardly from the container through a conduit 19, having a hose connection 21 with an atomizing nozzle 22 attached thereto. A blast of air is supplied to the nozzle by means of conduit 23 connected by means of hose 24 to a suitable source of compressed air (not shown).

It is to be understood that other masking materials such as wax (paraffin, beeswax or the like) may be substituted for asphalt as a masking material. When the plate has been properly masked by spraying masking material over the stencil 14, the latter element is removed, the back of the plate is then treated with silver solution and a reducing agent in accordance with conventional practice to lay down thin films of silver over those portions of the surface which are not masked. Of course films or metal may be applied by anodic sputtering or other methods. It is also contemplated to fire depositions of metal into the glass.

The front face of the sign or indicia is provided with the thin layer 6 of vitreous enamel fired thereupon or with any other suitable coating material, which will adhere to the glass strongly and permanently. This may be sprayed on as a slip or slurry and dried prior to the tempering operation. The heat of tempering will be sufficient to fuse and bond the enamel to the glass. The enamel is opaque and is also discontinuous to provide the desired indicia 7 upon the surface of the glass. The light striking the glass and passing through the openings in this film strike the reflective film upon the back of the plate and is scattered and dispersed in such manner as to strike the eye of an observer at almost any angle in front of the sign.

For purposes of securing the plate 5 to the mounting board 12, a mastic composition, such as a mixture of asphalt or pitch with a filler, such as clay, calcium carbonate or the like, may be employed. This material is sprayed or otherwise spread as an adherent layer 27, upon the backing board preferably while it is hot or while it is softened with a suitable solvent, such as gasoline, turpentine or any other convenient solvent agency. If the solvent is restricted in amount it is apparent that the layer 27 will harden very quickly upon chilling or cooling. Plate 5 should be applied to the plastic layer 27, while the latter is still soft and tacky by reason of heat or solvents. The plate itself may be heated to a temperature such that it will adhere to the layer 27.

If a masking material is employed upon the back of the plate, in order to cause the silver to be deposited in a desired pattern, it is apparent that by selection of one which is compatible with the mastic 27 the necessity of cleaning the back of the plate, after silvering, in order to remove the masking material prior to application to the backing board 12, is obviated. If, for example, the back of the plate is masked with a film of asphalt or the like material, which is compatible with the mastic composition of the layer 27, a bond directly to the glass is effected. This insures that the glass plate will be held in position without danger of stripping of the silver film from the glass.

For purposes of securing the signs or indicia to a mounting, such as a post or the like, the plate 5 may be formed with holes or openings 29, adapted to receive sleeves 31, of wood, fiber or other material having a certain degree of resilience or give. These elements may also be provided with flanges 32 resting upon or very slightly spaced from the face of the panel and of greater diameter than the opening 29. The backing board 12 is also formed with opening 33, concentric with but of lesser diameter than opening 29 and a securing bolt 34 extending through post or support 35. This bolt is provided at one extremity with a head 36, engaging the outer face of the sleeve 31, and at the opposite extremity it is provided with a nut 37 engaging the back of the support 35. It will be apparent that by tightening the nut 37, the sleeve 31 is clamped firmly against the outer face of the backing board 12, and in turn clamps the latter against the support 35. The plate 5 is thus firmly held in position without contact with metal and without the imposition of any concentrated loads upon the glass, which might possibly cause shattering thereof.

It will be apparent that the sign as thus constructed is highly efficient in operation. If the layer 6 of enamel is properly selected the contrast between the field of the sign and the indicia thereupon will be very high. It will also be apparent that large surfaces having a high degree of reflectance may be provided in the indicia themselves, insuring that the signs will have maximum attention attracting capacity.

It may be pointed out that the signs formed of tempered glass are inherently very strong and resist breakage to a remarkable degree, but in event that breakage does occur the sign plate shatters instantly into diced fragments that are retained in position by the mastic 27 at the back of the sign. In view of the inherently prismatic nature of the back of the plate the lines of shatter are blended in with the design upon the back in such manner that they are not noticeable or at least are not objectionable. It also seems to be a characteristic of the enameled plates that in the event that the plate is shattered the lines in the enamel either do not extend to the surface, or if they do, they are substantially invisible so that shattering of the plate does not substantially reduce the contrast between the background and the indicia proper. For these reasons signs constructed in accordance with the provisions of the invention continue to retain their utility substantially without impairment for long periods after breakage of the glass plates themselves. This is a characteristic which is due to the combination of a tempered glass plate having an enameled front surface and a mirrored rear surface.

The sign 40 disclosed in Fig. 2 is constructed in much the same manner as that disclosed in Fig. 1, but it is of rectangular outline and is not provided with a marginal frame corresponding to the frame 11. The plate is merely secured to a backing 41 of wood or the like by means of mastic 42. Its roughened rear face is provided with a reflective film 43 and its front face is provided with adherent layer 44 of enamel having openings 46 constituting indicia formed therein. Of course it is contemplated to silver the entire back of the film or at least the field portion 9 and then to enamel in only those portions of the face constituting the indicia. The indicia will then appear dark against a bright background.

The invention is excellently adapted for the construction of road markers, but it is to be understood that it is not limited to this field. Markers, such as stop signs and many other types of signs may be constructed in the same manner.

Figure 5:
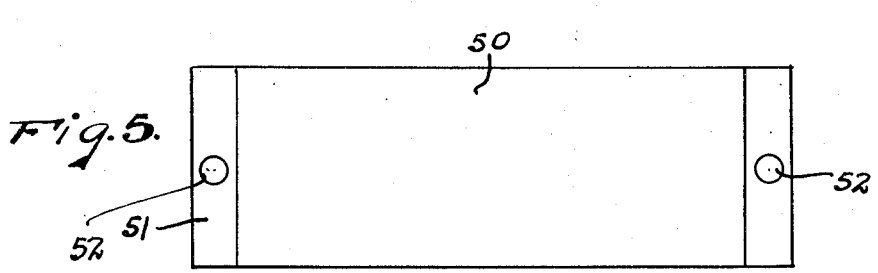

In the form of the invention shown in Fig. 5, the backing board projects substantially beyond the ends of the plate 50 and end cleats 51 are secured thereto. These cleats and the backing board are drilled as indicated at 52 to receive fastening bolts. The necessity of forming holes in the glass is thus obviated.

The forms of the invention herein shown and described are to be considered merely as exemplary. It will be apparent to those skilled in the art that numerous modifications may be made therein without departure from the spirit of the invention or the scope of the appended claim.

What I claim is:

A reflecting sign comprising a plate of glass tempered to shatter into small diced fragments if the plate is broken, the front of the plate being provided with a design in opaque vitreous enamel fired onto the plate, the back of the plate being silvered to give higher reflectance, further being rugose to disperse reflected light, the plate being bonded by an adhesive to a backing board so that upon rupture of the plate, the diced fragments are retained in place as small prisms adherent as a layer to said board and the frontal appearance of the sign is not substantially altered.

WILLIAM O. LYTLE.